United States Patent
Ebner

(10) Patent No.: US 9,316,378 B2
(45) Date of Patent: Apr. 19, 2016

(54) ARRANGEMENT FOR OUTPUTTING LIGHT WITH PUNCTIFORM LIGHT SOURCES AND LIGHT DEFLECTION ELEMENT

(75) Inventor: Stephan Ebner, Dornbirn (AT)

(73) Assignee: ZUMTOBEL LIGHTING GMBH, Dornbirn (AT)

( * ) Notice: Subject to any disclaimer, the term of this patent is extended or adjusted under 35 U.S.C. 154(b) by 195 days.

(21) Appl. No.: 14/128,929

(22) PCT Filed: Jun. 26, 2012

(86) PCT No.: PCT/EP2012/062307
§ 371 (c)(1),
(2), (4) Date: Dec. 23, 2013

(87) PCT Pub. No.: WO2013/000887
PCT Pub. Date: Jan. 3, 2013

(65) Prior Publication Data
US 2014/0133143 A1 May 15, 2014

(30) Foreign Application Priority Data

Jun. 29, 2011 (DE) .......................... 10 2011 078 287

(51) Int. Cl.
*F21S 8/10* (2006.01)
*F21V 13/04* (2006.01)
*F21V 5/00* (2015.01)
(Continued)

(52) U.S. Cl.
CPC ................. *F21V 13/04* (2013.01); *F21V 5/007* (2013.01); *F21V 5/04* (2013.01); *F21V 7/00* (2013.01); *F21V 7/0091* (2013.01); *F21V 9/08* (2013.01); *G02B 5/0215* (2013.01); *G02B 5/0278* (2013.01); *G02B 19/0028* (2013.01); *G02B 19/0066* (2013.01); *G02B 27/0961* (2013.01)

(58) Field of Classification Search
CPC ........... F21V 13/04; F21V 5/00; F21V 5/002; F21V 5/004; F21V 5/005; F21V 5/007
USPC ............................. 362/249.02, 235, 237, 244
See application file for complete search history.

(56) References Cited

U.S. PATENT DOCUMENTS

| 4,703,405 A | 10/1987 | Lewin |
| 6,940,660 B2 | 9/2005 | Blumel |

(Continued)

FOREIGN PATENT DOCUMENTS

| DE | 19542416 | 5/1996 |
| GB | 2295274 | 5/1996 |
| WO | 0233449 | 4/2002 |

OTHER PUBLICATIONS

International Search Report for PCT/EP2012/062307, English translation attached to original, Both completed by the European Patent Office on Sep. 10, 2012, All together 5 Pages.

*Primary Examiner* — Anabel Ton
(74) *Attorney, Agent, or Firm* — Brooks Kushman P.C.

(57) ABSTRACT

An arrangement for outputting light is provided, having a plurality of punctiform light sources and a light deflection element with a boundary face and/or a boundary face section, which boundary face or boundary face section is arranged in the beam path of the light of both a first light source and of a second light source. In this context, the boundary face or the boundary face section forms a light input face for the light of the first light source into the light deflection element and at the same time forms a reflective face for the light of the second light source.

16 Claims, 13 Drawing Sheets

(51) Int. Cl.
*F21V 5/04* (2006.01)
*F21V 7/00* (2006.01)
*G02B 5/02* (2006.01)
*G02B 27/09* (2006.01)
*G02B 19/00* (2006.01)
*F21V 9/08* (2006.01)

(56) References Cited

U.S. PATENT DOCUMENTS

| | | | | |
|---|---|---|---|---|
| 7,673,045 B1 * | 3/2010 | Battle | ................... | G06F 21/41 709/219 |
| 7,794,099 B2 * | 9/2010 | Wang | ................... | F21K 9/00 362/249.02 |
| 7,914,162 B1 * | 3/2011 | Huang | ................... | B60L 1/14 219/220 |
| 7,997,758 B2 * | 8/2011 | Zhang | ................... | F21K 9/00 362/235 |
| 8,287,150 B2 * | 10/2012 | Schaefer | ................... | F21S 8/085 362/237 |
| 8,622,573 B2 * | 1/2014 | Kubis | ................... | H05B 33/0887 362/217.03 |
| 8,672,509 B2 * | 3/2014 | Gordin | ................... | F21V 5/04 362/145 |
| 8,794,787 B2 * | 8/2014 | Boyer | ................... | F21V 7/0083 362/235 |
| 8,827,490 B2 * | 9/2014 | Kim | ................... | F21L 4/02 257/88 |
| 2006/0034094 A1 | 2/2006 | Asada et al. | | |

* cited by examiner

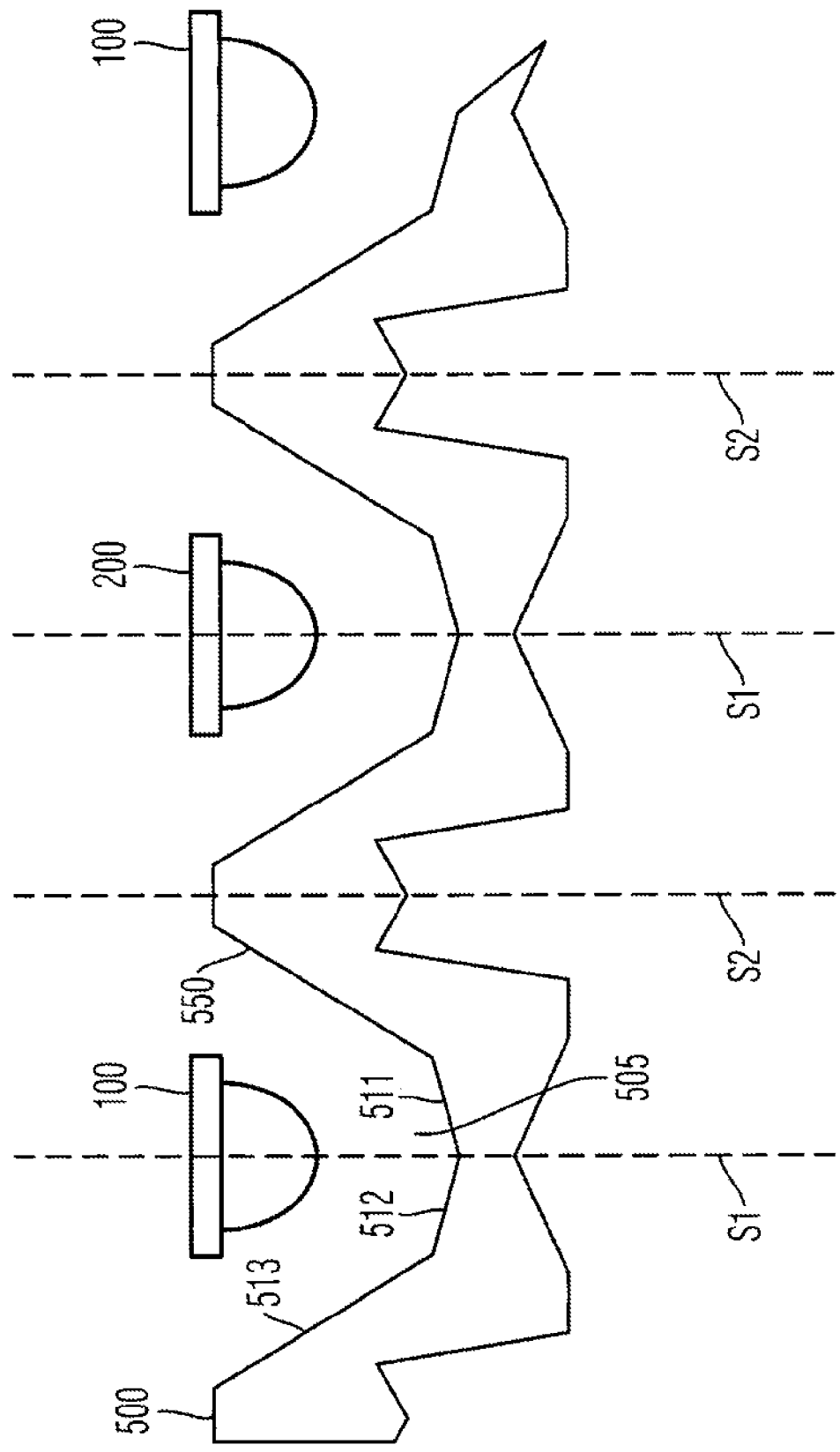

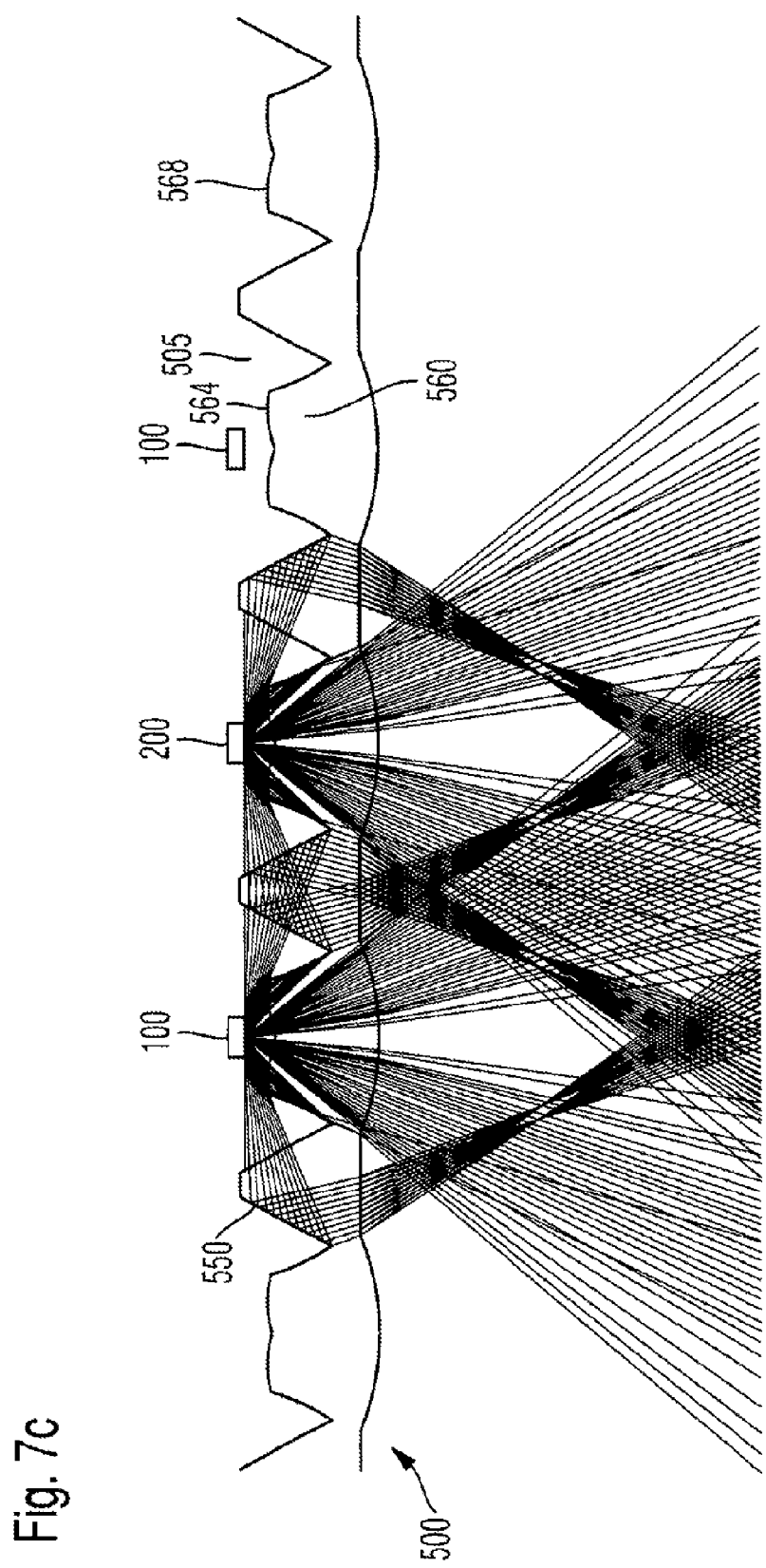

ARRANGEMENT FOR OUTPUTTING LIGHT WITH PUNCTIFORM LIGHT SOURCES AND LIGHT DEFLECTION ELEMENT

CROSS-REFERENCE TO RELATED APPLICATIONS

This application is the U.S. national phase of PCT Application No. PCT/EP2012/062307 filed on Jun. 26, 2012, which claims priority to German Patent Application No. 10 2011 078 287.7 filed on Jun. 29, 2011, the disclosures of which are incorporated in their entirety by reference herein.

TECHNICAL FIELD

The present invention relates to an arrangement for emitting light having essentially point light sources and a light directing element for influencing the light of the light sources.

BACKGROUND

Sources and Light Deflection Elements

Point light sources, in particular halogen lighting means or LED-based lighting means, have by now become central to lighting technology development in particular owing to their energy efficiency. Many point light sources in all power classes are available on the market, so that all lighting technology applications can be carried out with these light sources.

Often, particularly for the illumination of domestic and business rooms, the desire arises to achieve homogeneous light emission over a large light exit surface, so that for example the light output can take place homogeneously from the ceiling of a room. Taking into account reliability and energy efficiency aspects, the use of a multiplicity of the aforementioned point light sources is desirable.

In this case, however, there is the problem of combining or converting the light emission of a plurality of point light sources in such a way that the desired combined light emission—which may for example be homogeneous—is achieved.

To this end, large-surface light emission elements which combine the light output of a plurality of point light sources are known from the prior art. These may be formed from a plurality of lens elements, in which case the lens elements may also be combined integrally. According to a previously known combination of a plurality of lens elements, one point light source is respectively to be assigned to one of the lens elements, the point light source then being arranged in a cavity of the lens element. Each of the lens elements is formed in order to output a part of the light of the assigned light source essentially directly, while another part of the light is reflected by the lens element so as to obtain a relatively accurately delimited region of the light output, or a relatively accurately delimited lit region, which is illuminated by the light output of the one lens element. The combination of the light output, or the lit regions, then produces the desired lighting technology effect—for example desired homogeneous illumination of a surface.

SUMMARY

It is an object of the invention to improve a light emission element and a method for producing a corresponding light emission element, in such a way that in an arrangement for emitting light, corresponding to the type described above, the light emission of a plurality of point light sources can be combined in a straightforward way, or the possibilities for producing the arrangement for emitting light are optimized.

This object is achieved by the features of the independent claims 1, 15 and 16. The dependent claims relate to refinements of the invention.

According to the invention, a light directing element for influencing the light of at least two essentially point light sources arranged next to one another has a bounding surface or bounding surface section which is arranged in the beam path of the light of both the first light source and the second light source, the bounding surface or bounding surface section forming a light entry surface for the light of the first light source into the light directing element and the bounding surface or bounding surface section simultaneously forming a reflection surface for the light of the second light source on its side facing away from the light entry surface.

In this context, "arranged next to one another" is to be understood as meaning that there is no other light source on the shortest connecting path between the first and second point light sources.

Preferably, the light sources "arranged next to one another" are arranged on a common plate-like, or planar, support element, or a planar support surface, so that they have an essentially identical light output direction with respect to the support element.

An arrangement according to the invention for emitting light accordingly has a plurality of essentially point light sources, and a light directing element having a bounding surface or bounding surface section which is arranged in the beam path of the light of both a first light source and a second light source, the bounding surface or bounding surface section forming a light entry surface for the light of the first light source into the light directing element and the bounding surface or bounding surface section simultaneously forming a reflection surface for the light of the second light source on its side facing away from the light entry surface.

In contrast to solutions such as are known from the prior art, the light directing element configured according to the invention now has regions which are used simultaneously for influencing the light of a plurality of light sources, but fulfill a different function—refractive on the one hand and reflective on the other hand—in relation to the light sources. With the aid of these so-called cooperative regions, in particular the integration density of the point light sources can be increased—for example compared with the case in which separate lens elements are provided—so that more versatile possibilities are obtained for simple combination of the light emission of a plurality of point light sources. Furthermore, the configuration according to the invention likewise offers production advantages in the manufacture of the light directing element, since in particular the complexity of the structure can be reduced with the same efficiency, as will be illustrated below with the aid of special examples.

The essentially point light sources may be formed by one or more LEDs, which for example form a so-called LED cluster. In this case, "essentially point" means that a centrally symmetrical arrangement (group) of a plurality of LEDs is obtained, which only has differences from central symmetry due to the sizes of individual LEDs. Furthermore, essentially point light sources are also intended to mean halogen lamps, incandescent lamps and other lighting means having similar dimensions, the extent of the light output region of the light sources preferably not exceeding the single-digit centimeter range in a section plane parallel to the light output direction of the arrangement for emitting light.

Preferably, the light sources are arranged next to one another, for example on a common, preferably planar or plate-shaped support element. The light directing element particularly preferably has a positionally fixed arrangement with respect to the light sources; for example, this may likewise be achieved by a common support element. This provides the possibility of providing established light emission, in particular with a spatially established proportion of mixed light of the light sources. It is nevertheless possible that one or more light sources may be arranged movably with respect to the light directing element.

Particularly preferably, the light directing element may comprise cavities, in each of which one of the light sources is arranged. The aforementioned bounding surfaces or bounding surface sections in this case form the contour of these cavities. The light directing may be improved by one or more of the cavities respectively at least partially forming an optimized light entry surface in the form of a so-called lens region for the light of the light sources. For example, the bottom surface of the cavities could also be configured in the form of a lens.

Particularly preferably, the light directing element may essentially be formed in the shape of a plate, for example in order to permit a particularly compact design even with a large number of light sources, together with simple manufacture. For example, the cavities are in this case arranged facing a light exit surface of the light directing element, so that direct light emission can preferably take place via the light directing element, or its light exit surface. Furthermore, for example, in this way a common support element could readily be provided for the light sources and the light directing element.

In one refinement, the cavities have a polygonal base surface, or a polygonal surface projection. For example, the density of the arrangement of the light sources can thereby be increased and, furthermore, in this way it is possible to provide combinations of cavities whose surface projection fully covers a planar light exit surface of a light guide element. The surface projection of an individual cavity or of all cavities of the light directing element preferably has a polygonal shape.

According to one refinement of the invention, furthermore, the reflection of the light of the second light source at the bounding surface or bounding surface section configured according to the invention takes place by total internal reflection. For example, it is thereby possible to avoid semitransparent sections which, for example, would be formed so as to be transparent for the light of the first light source while they are reflectively coated for the light of the second light source, although according to the invention this is not necessarily ruled out. In the scope of the invention, it is likewise possible to provide semitransparent materials or corresponding coatings, particularly in the region of the bounding surface or bounding surface section.

It is furthermore conceivable for the light emission achieved with the arrangement according to the invention to be homogeneous; for example, the light directing element may be formed in order to collimate the light of the light sources.

In one exemplary embodiment, it is conceivable for the bounding surface or bounding surface section configured according to the invention to be formed in a planar fashion, so that a particularly simple arrangement of the light sources and corresponding simple manufacture of the light directing element is made possible. According to another exemplary embodiment, furthermore, the bounding surface or bounding surface section may also be curved, particularly preferably parabolically. In this case, it should be pointed out particularly that this includes in particular a polygonal base shape of cavities of the light directing element. Particularly optimized light directing can therefore be produced.

According to one refinement of the invention, furthermore, the light directing element is formed in order to convert the light of the first light source into a first light output characteristic and the light of the second light source into a second light output characteristic, the first and second light output characteristics being formed symmetrically, particularly preferably with symmetry of translation, with respect to one another. In this way, for example, homogeneous light emission can be produced with a multiplicity of essentially point light sources which, in an exemplary embodiment that is particularly simple to implement in design terms, may also be formed identically to one another.

Another possibility for improving the arrangement for emitting light consists, for example, in the arrangement for emitting light comprising a plurality of pairs of first and second light sources. It is in turn advantageous in design terms for the plurality of pairs preferably to be arranged in a row or a two-dimensional grid, so that the light directing element forms, for example, at least one axis of homogeneous light output. A plurality of pairs may in turn be arranged correspondingly adjacent, i.e. there are no other light sources on the shortest connecting path between the pairs, although this does not exclude the use of further light sources.

According to one refinement of the invention, furthermore, the arrangement for emitting light may comprise a plurality of light sources having mutually different light output. For example, a different color spectrum or a different color temperature, a different luminous density, which may for example also be polarization-dependently different, may be envisioned. For example, this may involve LED light sources which are preferably arranged as LED clusters, particularly preferably in an essentially point-like fashion. In this case, in particular, one or more LED clusters may respectively comprise LED light sources having mutually different light output (luminous density, color spectrum or color temperature). Particularly preferably, the light sources having mutually different light output are arranged in a regular grid.

For example, in this case it is also conceivable for the first light source to have a different light output than the second light source.

Furthermore, a method for producing a light directing element according to the invention may comprise the following steps:

producing, for example injection-molding, an essentially planar light directing element; shaping the light directing element preferably by cutting so that the desired shape is obtained.

In the case of a plurality of pairs of first and second light sources, step B) may for example be carried out in such a way that at least one bounding surface or bounding surface section which forms a light entry surface for the light of the first light source into the light directing element, and simultaneously a reflection surface for the light of the second light source, is assigned to each pair of first or second light sources.

BRIEF DESCRIPTION OF THE DRAWINGS

The invention will be explained in more detail below with the aid of the appended drawing, elements which are the same being provided with the same references in all the representations.

DETAILED DESCRIPTION

The use of point light sources for two-dimensional light output requires immense design as well as manufacturing technology outlay in order to achieve the desired illumination, since in particular the interaction of a plurality of light sources has to be taken into account. In particular, this frequently results in relatively complicated shapes of a light directing element which carries out the common light emission of a plurality of point light sources.

Figure 9:
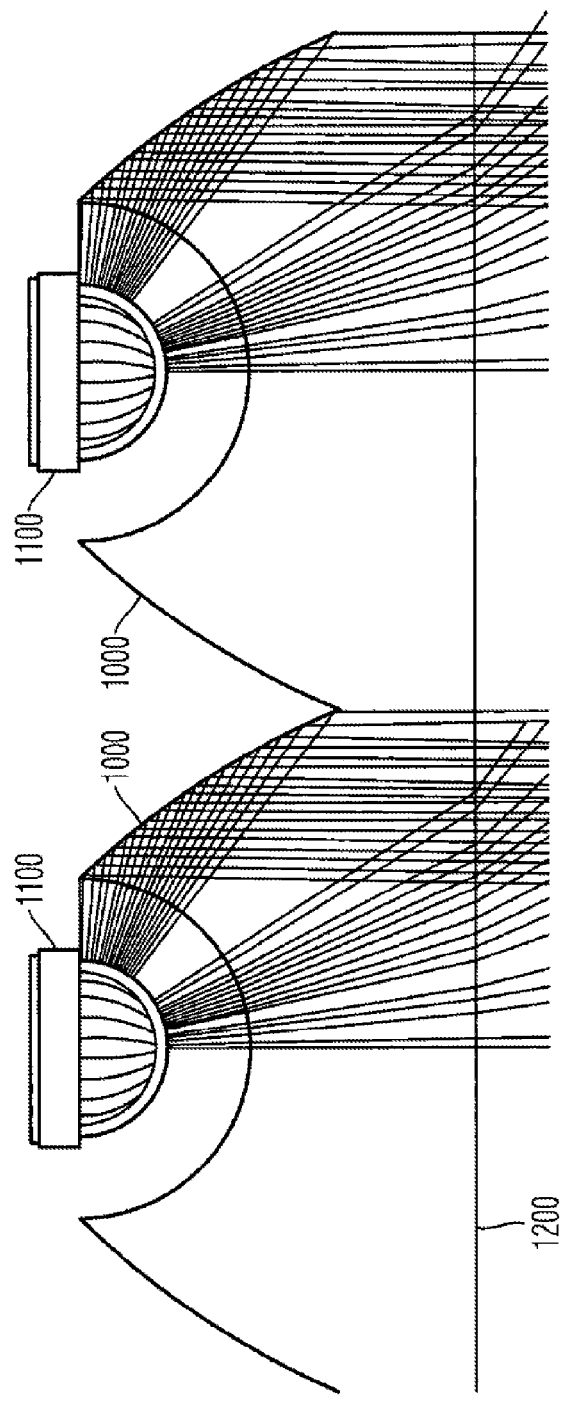
FIG. 9 shows a representation of an arrangement for emitting light according to the prior art.

FIG. 9 shows by way of example an arrangement for emitting light according to the prior art, which establishes the interaction of a plurality of point light sources. The represented arrangement for emitting light according to the prior art comprises a plurality of transparent lens elements 1000, which are connected to form a common light directing element with the aid of a light exit plate 1200. Each lens element 1000 has a frustoconical configuration with a hemispherical depression, or cavity, in which a light source 1100 assigned to the lens element 1000 is arranged. The light output of the light source 1100 is thus coupled over a large solid angle range into the lens element 1000. The lens element is in this case shaped in such a way that a part of the light coupled in is output essentially directly via a common light exit plate 1200. Another part is reflected—usually totally internally reflected—at lateral sections of the lens elements 1000 which are formed as a reflector and deviated in the direction of the common light exit plate 1200. With suitable selection of the proportions between reflected and directly output light, for example, homogeneous light output can be achieved over the light exit plate. This concept, however, has some disadvantages.

For example, the density of the arrangement of the light sources 1100 is restricted, or conditioned, by the size of individual lens elements 1000, so that the possibilities for configuration of the light emission are limited. Furthermore, in particular the light output in the transition region between two adjacent lens elements represents a challenge in the design and manufacture of the lens elements 1000.

The invention is based on the need to reduce said design and production technology outlay for the light directing element, and to improve the possibilities of the interaction of a plurality of point light sources.

If, for example, homogeneous light output is intended to be achieved over the entire ceiling of a room, or at least over a sizeable surface, then the use of light guides may also be envisioned. For light emission over sizeable surface regions, however, the interaction of a plurality of light guides is here again necessary, so that the above-described arrangement of light sources in a grid will preferably be considered. In this case, the overlap region of the light emission of at least two light sources is to be adapted in such a way that desired light output results, which is particularly difficult for example for the aforementioned homogeneous light output. The production of other lighting technology effects can also be optimized with the aid of the invention.

Figure 1A:
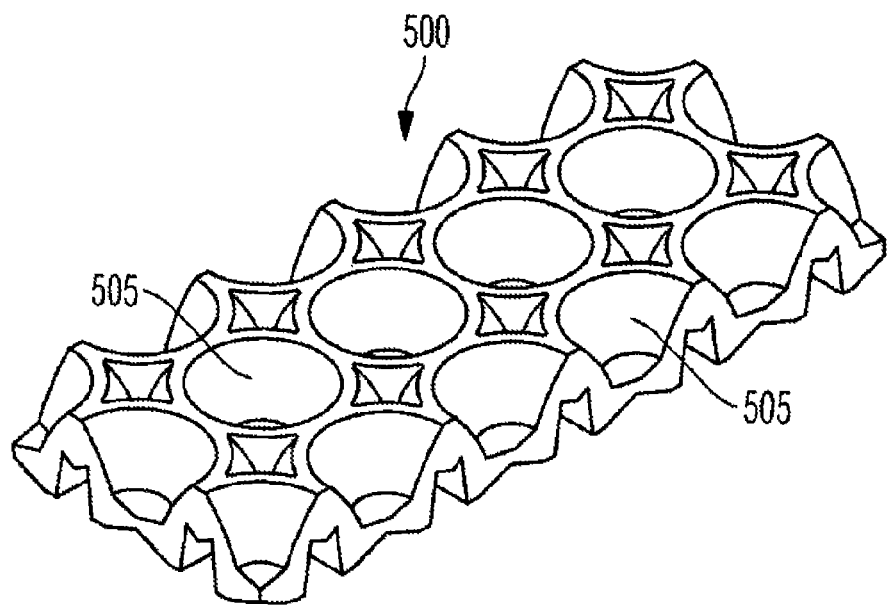
FIGS. 1a) to 1d) show a first exemplary embodiment of an arrangement for emitting light.
Figure 1B:
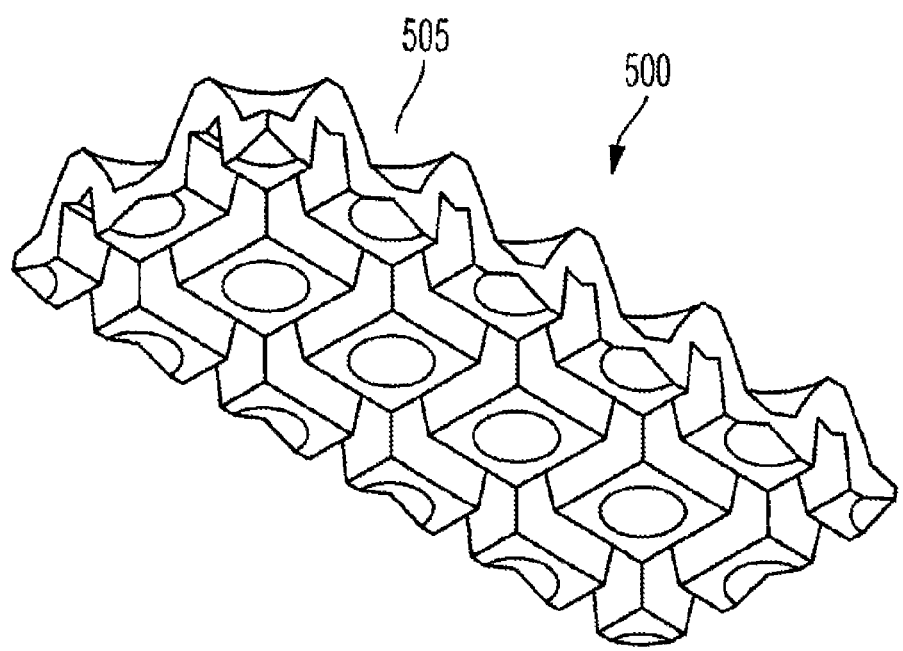

A first exemplary embodiment of the invention is represented in a perspective view in FIGS. 1a and 1b. In a similar way to the above-described lens arrangement of the prior art, in this example a plurality of point light sources are to be combined with a light directing element 500 for the light output of the light sources. In the exemplary embodiment, a regular arrangement of light sources—which are not represented in FIGS. 1a and 1b—is provided in a grid, the light sources respectively being arranged in a similar way to the above-described lens elements 1000 in cavities 505 of the light directing element, in such a way that precisely one light source is assigned to each cavity 505. The arrangement of the cavities 505 may for example be seen in detail in FIG. 1a, which shows a perspective view of the light directing element 500. FIG. 1b furthermore shows the lower side of the light directing element 500, which lies opposite the light sources and which forms a light exit surface of the light directing element.

The representations of FIGS. 1 to 3 are respectively to be understood identically in the following way for the subindices a and b for various exemplary embodiments. The subindex a in each case denotes a perspective view of the light directing element 500 on the side of the light directing element 500 facing toward the light sources, and the subindex b in each case shows a perspective view of the light emission surface of the light directing element 500.

Figure 1C:
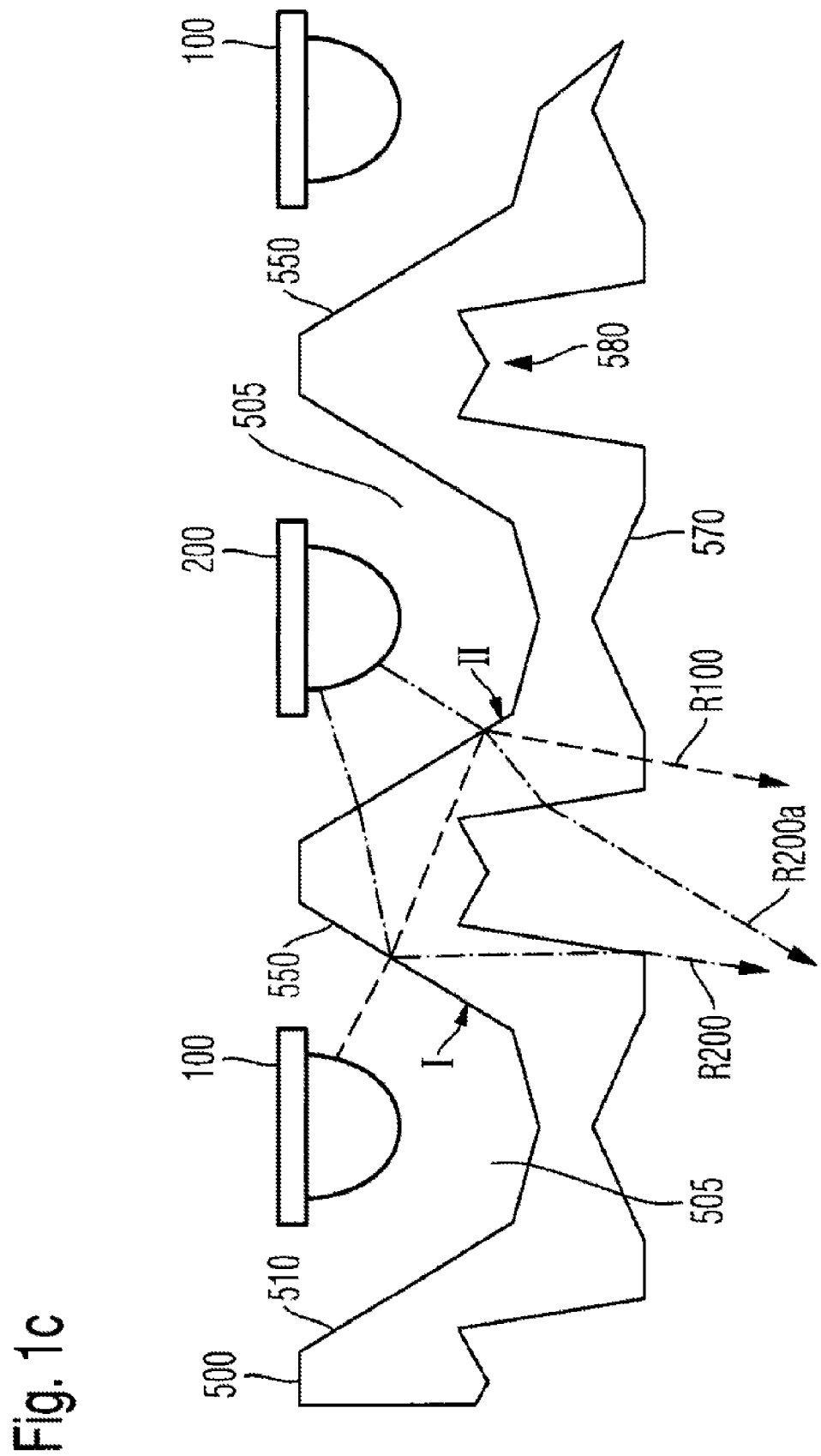

The lighting technology effect, as described below, of the invention can be seen in detail in a sectional representation of the exemplary embodiment of FIGS. 1a and 1b, which is shown in FIGS. 1c and 1d.

According to the invention—as shown in FIGS. 1c and 1d—an arrangement for emitting light is provided, which comprises a plurality of light sources arranged next to one another. In order to explain the functionality of the light directing element 500, a first point light source 100 and a second point light source 200—located next to the former—will be discussed below, although in general they are identical light sources.

The light directing element 500 consists of a plurality of lens-like regions, which are arranged in accordance with the arrangement of the light sources 100, 200. Each lens-like region has a depression or cavity 505, in which the associated light source is arranged. In order to use the light of the light sources effectively, in this case the light sources are preferably arranged fully or almost fully inside the associated cavity 505. The surfaces 511, 512, 513 and 550 of the cavity 505 then form the corresponding light entry surface for the light. A first part of the light is refracted when entering the light directing element 500, in such a way that it leaves the latter directly on the lower side. Another part, on the other hand, which strikes the regions 513 and 550, is—as explained below and shown in FIG. 1c-reflected at the surface 550 of the adjacent cavity 505 and deviated toward the lower side.

The particular feature of the arrangement according to the invention is the aforementioned bounding surfaces or bounding surface sections 550, which lie in the beam path of the light of both the first point light source 100 and the second point light source 200. In this case, the bounding surface or bounding surface section 550 on the one hand forms a light entry surface for the light of the first point light source 100, and on the other hand the bounding surface or bounding surface section 550 simultaneously forms a reflection surface for the light of the second point light source 200 on its side facing away from the light entry surface, as shown by the ray profiles shown in FIG. 1c.

The light mixing is represented by way of example with the aid of the light rays R100 coming from the first point light source 100 and R200a coming from the second point light source 200. The light ray R100 is reflected at the bounding surface II in such a way that it leaves the light directing element 500 approximately at the same exit angle as the light ray R200a. The configuration, according to the invention, of the bounding surface I is furthermore illustrated with the aid of the light rays R100 and R200. The light ray R100 enters the light directing element 500 in the region of the bounding surface I, or 550, while the light ray R200 is reflected at the same position on the bounding surface I, or 550, and a region of the common light path of the light of a plurality of point light sources is thus in turn established with the aid of the bounding surface I, or 550, according to the invention.

An interaction of at least two point light sources 100, 200 can thus particularly advantageously be optimized and adapted with the aid of the invention. The bounding surface or bounding surface section 550 is formed as a reflection surface; the light emission of one of the point light sources—in this case the light emission of the second point light source 200—can thus be spatially limited. At the same time, the bounding surface or bounding surface section 550 acts as a light entry surface for the light of the other point light source—in this case the first point light source 100—so that a spatially delimited overlap region of the light output of the two light sources 100, 200 is already established by properties of the light directing element 500. In contrast to the combination of the lens elements 1000 of the prior art, a region of overlapping light output of the first and second point light sources 100 and 200 is therefore already established within the light directing element, so that an interaction of the light output of the first and second point light sources 100 and 200 which is simple in design terms and, for example, can be established independently of the distance of an illuminated surface can be achieved.

Another advantage of the solution according to the invention is furthermore that, owing to these "cooperative regions" of the lens arrangement, i.e. of the regions used in common by adjacent light sources 100, 200 and delimited by the surface sections 550, the lenses so to speak merge into one another and accordingly a more compact arrangement for the light sources 100, 200 and a higher luminous density can be achieved.

In the exemplary embodiment of FIGS. 1c and 1d, reflection of the light of the second point light source 200 at the bounding surface or bounding surface section 550 takes place by total internal reflection.

The arrangement for emitting light may in this case be provided for direct mounting on or at a support, for example on a ceiling, supports of a suspended ceiling, a wall or the like. Furthermore, integration into a light housing or a housing frame may also be envisioned. Preferably, the light directing element 500 forms the only light exit surface of the arrangement for emitting light and, to this end, it may for example be arranged in, or close, an opening of a light housing, or it may be connected to a support in such a way that no additional light can emerge from the arrangement, or the light. Particularly preferably, the light directing element 500 is formed in a planar fashion, that is to say its height extent differs from both its width extent and its length extent, so that the height of the light directing element establishes a narrow side of the light directing element 500, while other surfaces form a wide side of the planar light directing element 500. In one refinement of the invention, the first and second light sources 100 and 200 are arranged on a wide side of the light directing element. Particularly preferably, an opposite wide side forms a light exit surface of the light directing element 500.

According to the invention, optical surfaces of the light directing element 500, or particular regions thereof, are therefore to be used together for a plurality of light sources. Owing to the fact that optical elements assigned to the light sources are also used by adjacent light sources, the single optical element has a relatively small installation size. In particular, this makes, extremely planar and thin optical plates possible as light directing elements 500, which also permit integration of a multiplicity of first and second point light sources 100 and 200, so that for example the grid-like arrangement of the first and second light sources 100 and 200 according to the perspective views of FIGS. 1a, b to 3a, b can be obtained.

Each of the light sources may simultaneously fulfill the role of the first and second point light sources 100 and 200, i.e. each of the light sources interacts with each immediately adjacent light source via the light directing element 500, in such a way that each adjacent light source forms a second point light source 100 in the sense of the invention for the respective light source, in which case the respective light source is to be regarded as a first point light source in the sense of the invention.

Preferably, the light directing element 500 is formed from an essentially transparent material, preferably glass, PMMA (polymethyl methacrylate) or another transparent plastic. This does not exclude the possibility that the light directing element 500 also comprises regions of a nontransparent material.

Particularly preferably, the light directing element 500 is formed in one piece; this, however, includes the possibility that the light directing element 500, for example for particularly large light exit surfaces, is formed in a plurality of parts and for example comprises a plurality of planar sections, which are configured so as to be connectable to one another, preferably with integrated fastening means. In particular, the manufacture and mounting of the light directing element 500 can be optimized in this way.

The arrangement for emitting light according to FIGS. 1c and 1d is formed, in particular, for homogeneous light output; depending on the application, however, other configurations may also be envisioned. In the case of the exemplary embodiment described, the homogeneous light is output via a light exit surface of the light directing element 500 which lies opposite the first and second point light sources 100, 200. In particular, the light directing element 500 is formed in order to collimate the light sources 100, 200.

The light directing element 500 according to FIGS. 1c and 1d, formed in a planar fashion, comprises, as already mentioned, a plurality of cavities 505, in each of which one of the first or second point light sources 100 or 200 is arranged. As already described, the detail of the arrangement of the cavities 505 may again be seen particularly in FIGS. 1a and 1b, which show another representation of the exemplary embodiment. According to the exemplary embodiment, the cavities are arranged in a row or a two-dimensional grid, as will become clearer below. Both the cavities and the first and second point light sources 100, 200 are in this case arranged opposite a light exit surface of the light directing element 500, which is oriented in the direction of the surface extent of the light directing element 500. At the same time, as described above, the light exit surface of the light directing element 500 also forms a light exit surface of the arrangement for emitting light.

In the exemplary embodiment of FIGS. 1a to 1d, parts of the cavity-delimiting surface 510 form a bounding surface or bounding surface section 550 according to the invention. According to FIGS. 1c and 1d, the bounding surface section 550 is formed in a planar fashion, so that a light entry surface for the light of the first point light source 100 can be formed in a particularly simple way. Furthermore, a surface can be oriented optimally with respect to the second point light source 200 in such a way that at least one light subbeam of the light output by the second point light source 200 strikes the bounding surface or bounding surface section 550 more shallowly than the total internal reflection angle. Simple adaptability of the reflection region of the bounding surface or bounding surface section 550, and therefore of the overlap region of the light output of the first and second point light sources 100, 200, can be implemented in this way.

The cavity-delimiting surface 510 comprises—immediately adjacent to the bounding surface or bounding surface section 550—two further planar surfaces 511 and 512, which form the bottom region of the cavity and which are arranged, in order to guide the direct light output of the first point light source 100, inclined in a "V" shape with respect to one another at an obtuse angle, preferably between 120 and 160 degrees, and collimation of the light of the first point light source 100 is for example achieved in this way.

Furthermore, a further bounding surface 513 formed in a planar fashion, which may constitute a bounding surface or bounding surface section 550 formed according to the invention for a further point light source 200 (not shown), is arranged following the two surfaces 511 and 512 arranged in a "V" shape. The light source (not shown) is in this case arranged mirror-symmetrically with respect to a mirror plane which contains the connecting line from the first point light source 100 to the apex of the "V" of the surfaces 511, 512 arranged in a "V" shape. In combination, the surfaces 550, 511, 512 and 513 describe the cross section of a cavity 505 in which the first point light source 100 is arranged. The apex of the "V" in this case forms a center of the cavity 505, the connecting line of which to the first light source 100 lies in a symmetry plane of the cavity 505, or a first symmetry plane S1 of the light directing element 500, in which case the light output of the first point light source takes place symmetrically with respect to this first symmetry plane S1 of the light directing element and the symmetry plane S1 may in particular contain a main emission direction of the first point light source 1.

A further, second symmetry plane S2 of the light directing element 500 may, however, be established by a normal to the connecting line of the first and second point light sources 100 and 200. Said normal, which symmetrically divides the connecting line, is in this case contained in the second symmetry plane S2. Furthermore, the symmetry plane S2 may also divide the normal of said connecting line in a different intended ratio, which, however, is periodically reproduced in the combination of a plurality of point light sources.

In particular, the first or second symmetry planes S1 or S2 may be arranged in a regular grid, so that a simple possibility is thereby provided for combination of a plurality of point light sources. This includes, in particular, the possibility that the grid sizes of the first and second symmetry planes S1 and S2 are selected differently. Corresponding refinements will be described in more detail below.

FIG. 1a shows the planar configuration of the light directing element 500 of FIGS. 1c and 1d in more detail. The cavities 505 are configured essentially frustoconically in this case, the lateral surface of the conical frustum comprising the bounding surface section 550 according to the invention. The top surface of the conical frustum, facing away from the first or second light source 100 or 200, itself in turn has the shape of a cone, the vertex angle of which differs from the vertex angle of the conical frustum so that the already described combination of the surfaces 511, 512, 513 and 550 according to FIGS. 1c and 1d is obtained in cross section and a conical collimating section of the light directing element 500 is formed. The first and second point light sources 100, 200 are in this case arranged in a square grid, and respectively assigned to one of the cavities—which in this case are formed frustoconically. A uniform arrangement of preferably identical light sources can be achieved in this way.

The square grid is reproduced in the surface projection of the base surface of the cavities. As represented in FIG. 1b, the light exit surface has rectangular or square elevations; each of the elevations in this case forms the above-described frustoconical cavity on the side of the light directing element 500 facing toward the first or second light sources 100, 200.

On the top surface of the elevations, a frustoconical light shaping element 570 is in turn arranged, which thus has a "V"-shaped cross section and therefore likewise improves the collimation of the light. Furthermore, other light shaping elements 570 may nevertheless also be envisioned, which for example deviate the direct light output of the associated light source into a preferential direction and which, for example, are formed in order to output the light in a collimated fashion in this preferential direction.

The connecting sections of the square elevations and their side surfaces respectively optimize light mixing elements 580 for mixing the light of adjacent light sources 100, 200. The side surfaces and the connecting sections approximately have a "W" shape in combination in cross section. This "W" shape may in turn be regarded as the combination of a first "V"-shaped section, which is assigned to a side surface of a square elevation, and a second "V"-shaped section, which is assigned to an adjacent side surface of a further square elevation. The light mixing elements 580 are preferably arranged following the bounding surface or bounding surface section 550 according to the invention in the light path of the first and second point light sources 100 and 200. The arrangement symmetrical with respect to the first and second point light sources 100, 200, in particular symmetrical with respect to the symmetry plane S2, in this case simultaneously conditions the establishment of a region in which the mixing of the light emission of the first and second point light sources takes place. In combination, by a shape which is preferably doubly collimating, or limiting for the light output, the "W"-shaped section thus optimizes the light mixing in the region between the cavities, i.e. in the region of the overlap of the light output of the first and second light sources 100 and 200.

According to another refinement, the bounding surface or bounding surface section 550 may also be curved. Particularly preferably, the bounding surface or bounding surface section 550 is parabolically shaped, so that a light source—preferably the first and second light source 100 and 200—can be arranged at the focal point of the associated parabola and collimation of at least one subbeam of rays of the first or second point light source 200 takes place. In the exemplary embodiment represented, for example, the bounding surface of the cavity in which the first point light source 100 is arranged may be curved so that this bounding surface section is parabolically shaped in such a way that the second point light source 200 is arranged at the focal point of the associated parabola.

The above refinement includes the possibility that curved regions of the bounding surface or bounding surface section 550 are combined with planar regions of the bounding surface or bounding surface section 550. For example, the combination of curved surfaces and parabolic sections may also be provided with sections of the frustoconical or conical cavities.

Figure 2A:
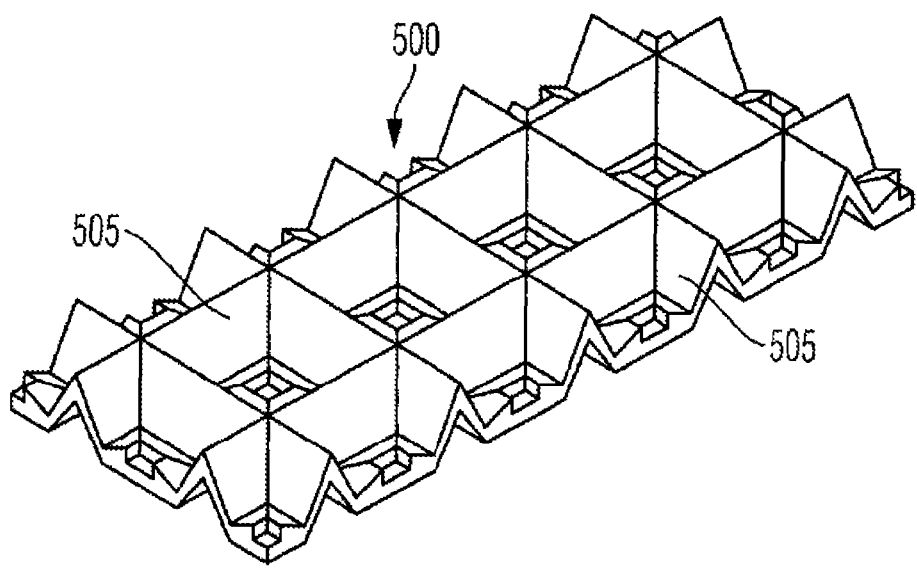
FIGS. 2a), b) show a second exemplary embodiment of a light directing element according to the invention.
Figure 2B:
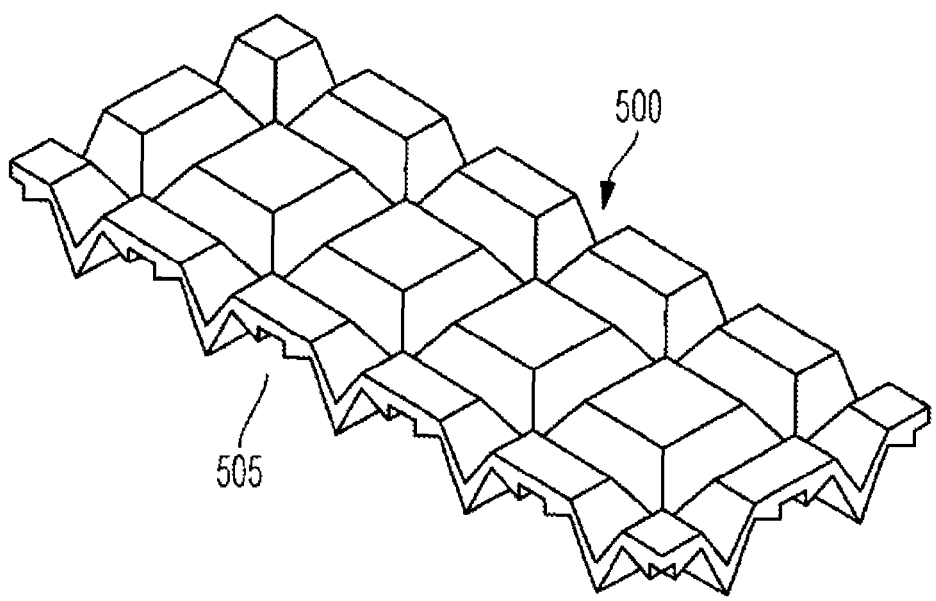

In another exemplary embodiment, according to FIGS. 2a and 2b, the cavity 505 has a polygonal base surface, in particular a square base surface, so that the surface projection of the cavity 505 reproduces the arrangement of the light sources with an offset. In contrast to the exemplary embodiment described above, the cavities 505 are now shaped pyramidally or frustopyramidally, each side surface of the pyramid or frustopyramid forming a bounding surface section 550 according to the invention, i.e. in particular a reflection surface and a light entry surface, in which case the light incidence of adjacent light sources into the frustopyramid may thus be fully restricted.

The light exit surface in this case likewise has square elevations; as will become clearer below, however, this shape may be adapted to any polygonal configuration of the cavities or the projection surface thereof, so that for example triangular, rectangular, pentagonal, hexagonal or other polygonal elevations of the light exit surface lie within the scope of the invention. In the exemplary embodiment of FIGS. 2a and 2b, the light mixing elements 580 are formed by the side surfaces of the polygonal elevations and have a "V"-shaped cross section, so that the light exit surface can on the one hand be configured in a visually particularly attractive way and, on the other hand, particularly advantageous light mixing is obtained. Furthermore, light shaping elements 570 on the top surface of the polygonal elevations can be obviated in this exemplary embodiment; as can be seen in FIG. 2a, these are produced on the inner side of the cavity, facing toward the first or second light sources 100 or 200. The base surface of the cavity has, facing toward each side surface, a prismatic, sawtooth or triangular elevation and these optimize, in particular widen, the direct light output of the first or second light sources 100, 200 assigned to the cavity.

Figure 3A:
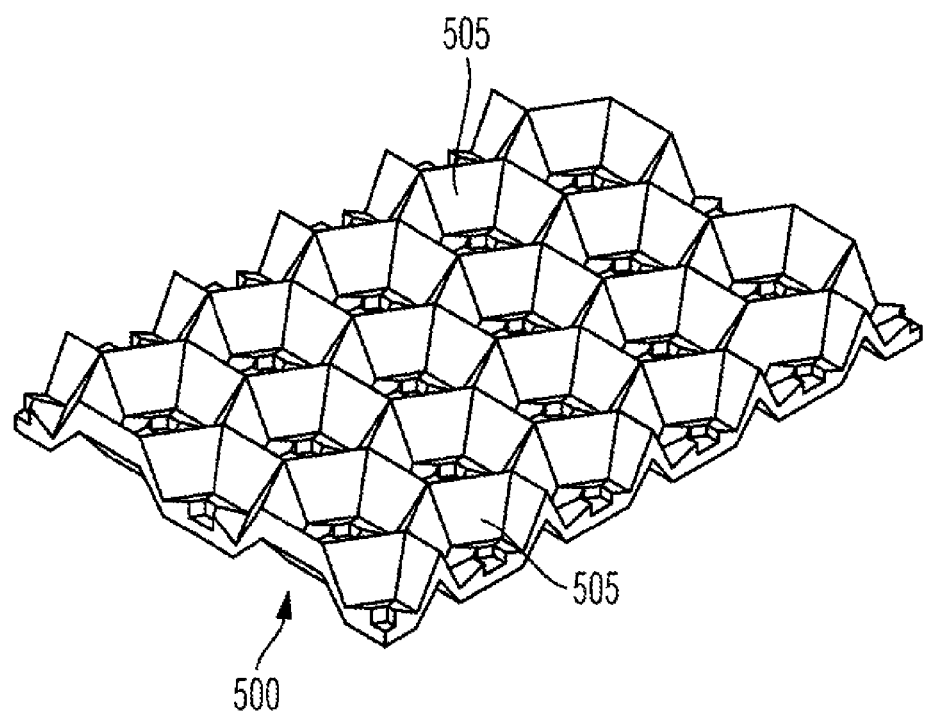
FIGS. 3a), b) show a third exemplary embodiment of a light directing element according to the invention.
Figure 3B:
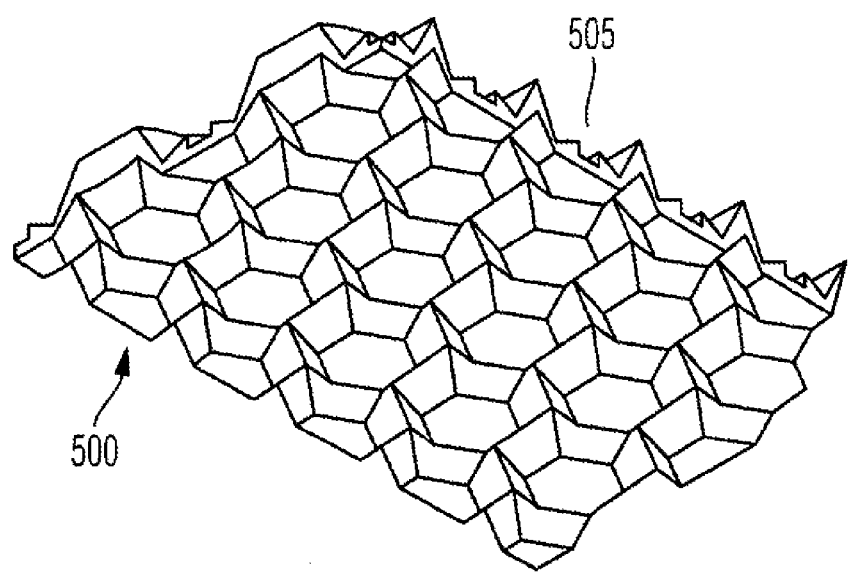

A refinement of the invention, in particular of the exemplary embodiment of FIGS. 2a and 2b, which is represented in FIGS. 3a and 3b, shows a light directing element 500 which has polygonal pyramidal cavities 505 with a hexagonal base surface, and respectively polygonal, hexagonal elevations of the light exit surface. Each of the side surfaces is in this case formed in order to reflect the light of one of the second point light sources 200, which is arranged in an adjacent cavity 505, so that six second light sources 200 in a respectively adjacent cavity 505 are assigned to the first light source 100 in this exemplary embodiment. The light emission of the second light source 200 may in this case be fully restricted with respect to the first light source 100 by the bounding surfaces or bounding surface sections 550 according to the invention, so that the cavity 505 is closed for light of the assigned—in this case the six—second light sources 200. This may, for example, also be achieved for any polygonal cavities 505 or any number of adjacent light sources. The base surface of the cavities 505, as well as the light mixing elements 580, are configured in accordance with the exemplary embodiment described above.

The limiting case of a polygonal cavity having a large number of bounding surfaces may in this case be described by an elliptical or circular base surface of the cavity, so that for example the frustoconical cavity of the above-described exemplary embodiment of FIGS. 1a to 1d is obtained.

Figure 4:
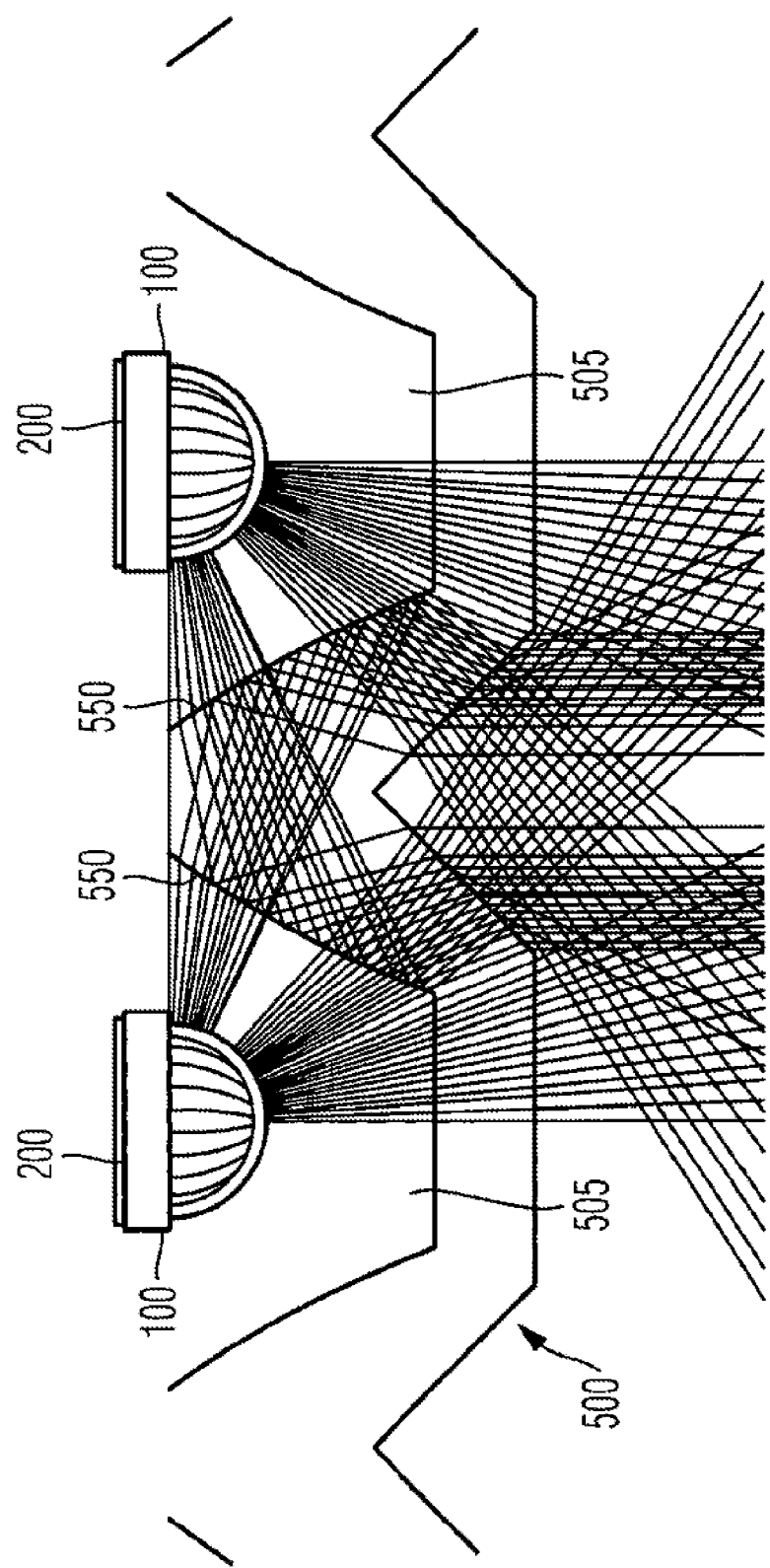
FIG. 4 shows a detail representation which illustrates the light mixing with the aid of an exemplary embodiment of an arrangement for emitting light.

FIG. 4 again illustrates the lighting technology effect, according to the invention, of the light mixing within the light directing element 500. An overlap region of the light output of the first and second point light sources 100 and 200 can be established independently of the distance of the illuminated surface. This offers the possibility of optimized compensation for intensity differences, or other light output differences, of the first and second point light sources 100 and 200 already in the light directing element 500, so that for example established masking of the light emission can take place. In this way, for example, homogeneous light emission from the light directing element 500 can also be improved.

Figure 5:
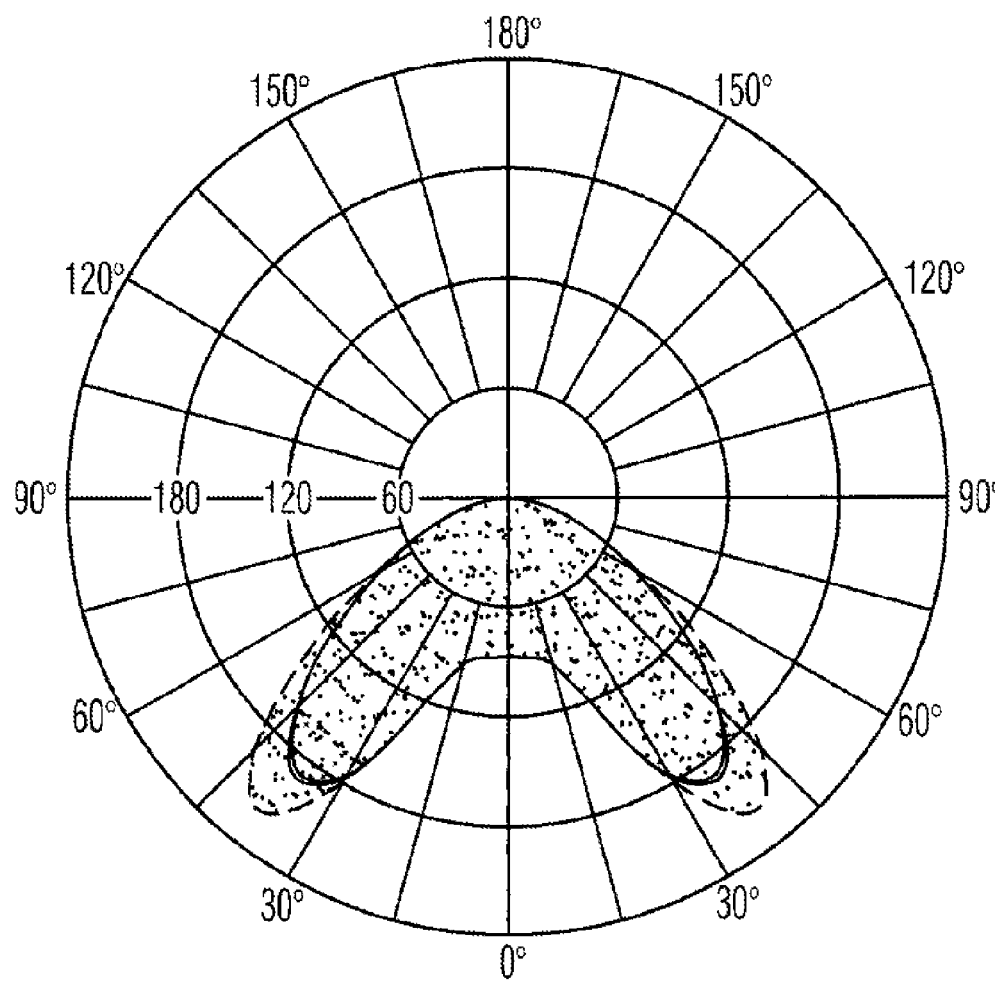
FIG. 5 shows an example of the light output of an individual light source with the aid of an exemplary embodiment of the light directing element.

With the aid of the refinements described above, not only can an attempt be made to achieve homogeneous light output over the light emission surface of the light exit element, but furthermore inhomogeneous light emission may also be envisioned, according to the invention the interaction of a plurality of point light sources being optimized. For example, FIG. 5 shows the light emission of an arrangement for emitting light, having a light directing element 500 which carries out inhomogeneous light emission. The choice of the base surfaces of the cavities, or the polygonal shape of the cavities, may in particular be adapted to the desired light output, so that for example it is possible to achieve a rotationally symmetrical, rectangular, square, cross-shaped or other polygonal light distribution for a single one of the first or second point light sources. Owing to the fact that the grid of the light sources, which may in particular be described by a grid of symmetry planes S1, is reproduced in a grid of the symmetry planes S2 with an identical grid size, despite inhomogeneous light output of an individual cavity, or of a light source (for example the first point light source 100) assigned to this cavity, it is possible to achieve an interaction with a plurality of light sources in such a way that the overall light output of the arrangement for emitting light nevertheless appears homogeneous in terms of the luminous density. Particularly preferably, this may also be achieved for a surface to be illuminated.

In order to achieve further lighting technology effects, regions of exaggerated—i.e. increased or reduced—luminous density may particularly advantageously be achieved in that the grid size S2 differs at least in subregions of the light directing element from the grid size S1. As an alternative or in addition, a plurality of light sources of the arrangement for emitting light, in particular the first and second point light sources 100 and 200, may also have a different light output than one another. Particularly preferably, this relates to the luminous density, color spectrum, the color temperature or, for example, also the polarization of the light. In one refinement, in particular, the first point light source 100 has a different light output than the second point light source 200.

With the aid of the configuration, according to the invention, of the arrangement for emitting light, or of the light directing element 500, it is thus particularly advantageously possible to achieve light mixing of two adjacent point light sources. With the aid of light sources having different light output, this may for example also be used for color mixing.

Figure 6A:
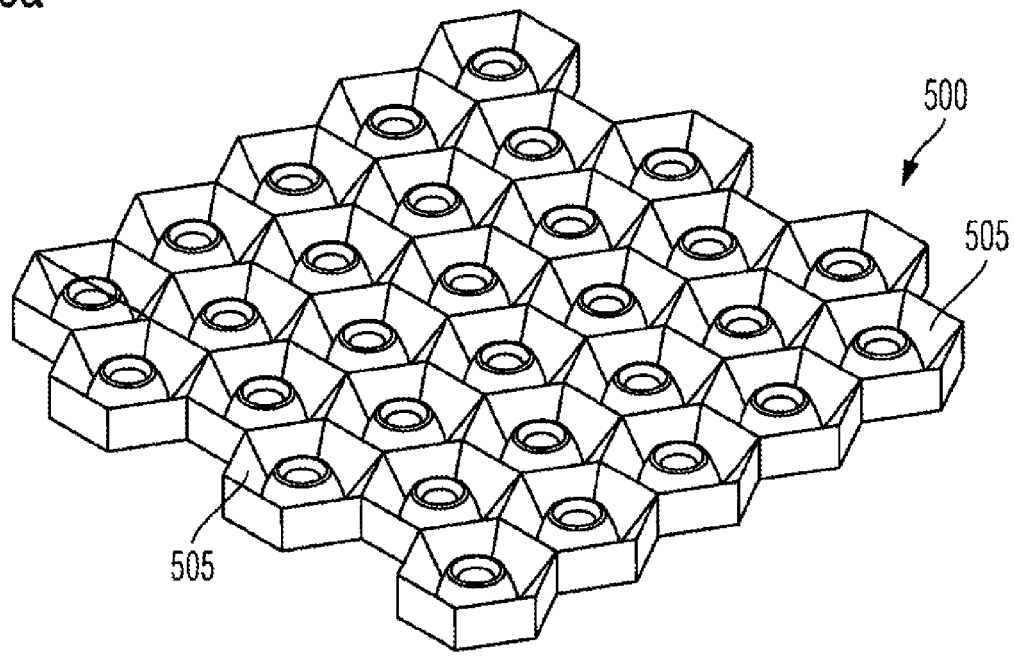
FIGS. 6a) to 6c) show a fourth exemplary embodiment of an arrangement for emitting light.
Figure 6B:
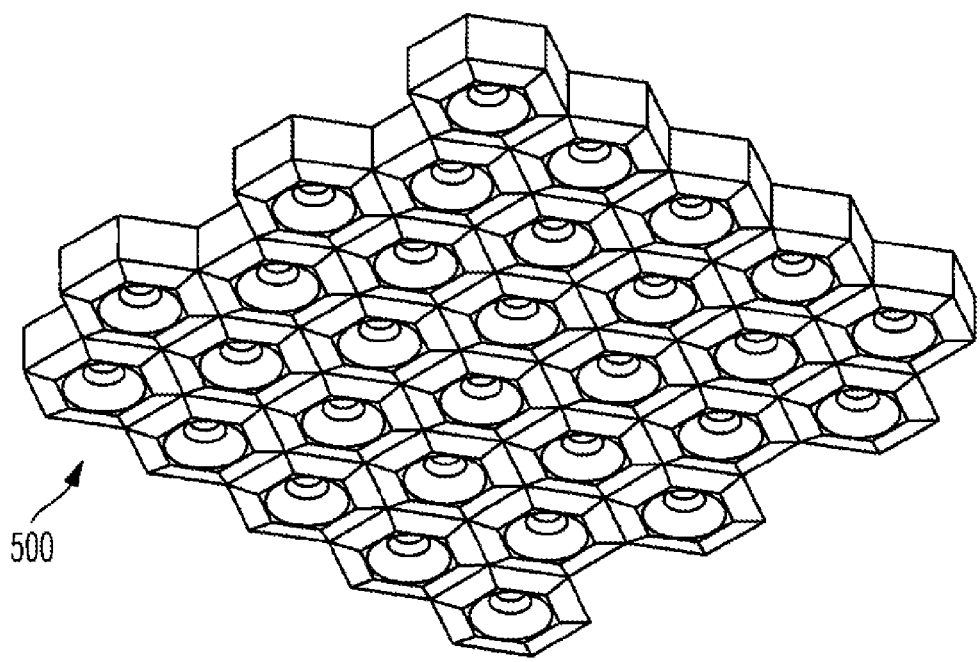
Figure 6C:
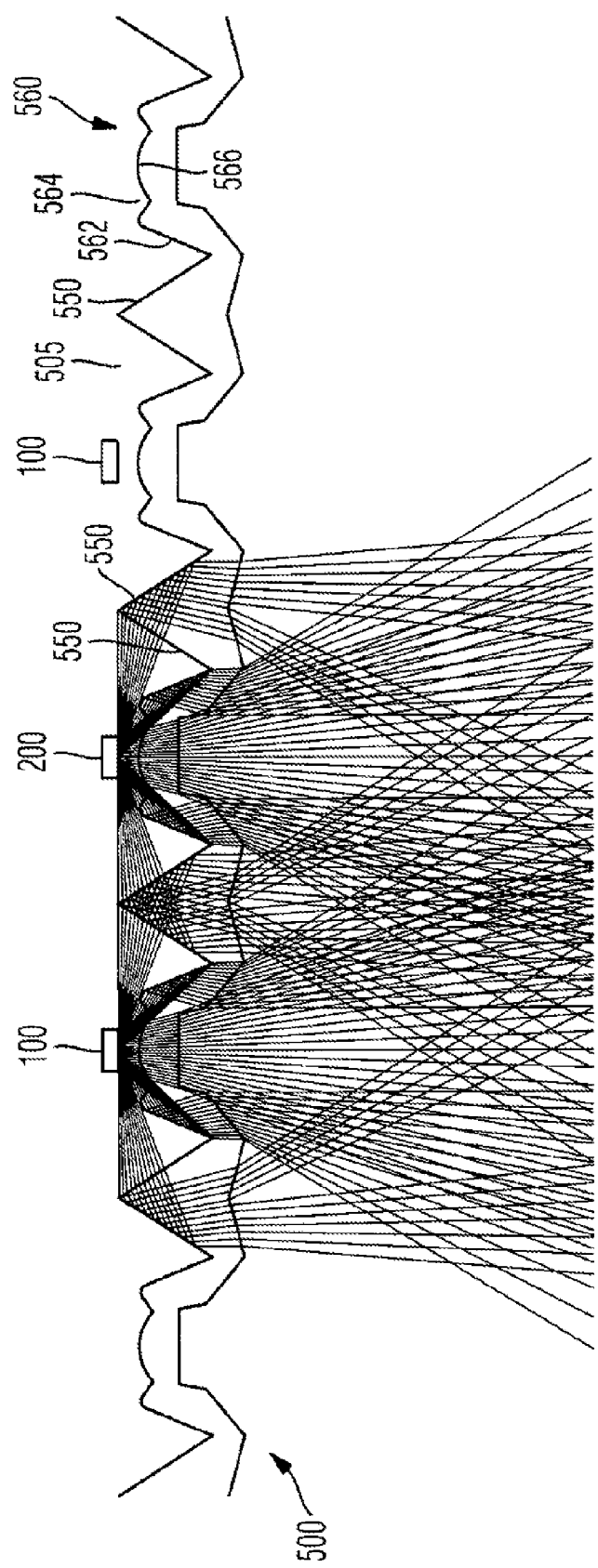

FIGS. 6a to 6c shows another exemplary embodiment of a light directing element 500 configured according to the invention, FIG. 6a showing a view from above, FIG. 6b showing the lower side of the light directing element 500 and FIG. 6c showing a sectional representation. Likewise as in the exemplary embodiment according to FIGS. 3 and 3b, the light sources 100, 200 and associated cavities 505 of the light directing element 500 are arranged in a hexagonal structure, although—as mentioned above—other regular arrangements may of course also be used. The transition between two adjacent cavities 505 is here again formed by a cooperative region, which is delimited by the surfaces 550 and now is formed essentially triangularly in cross section.

A first particular feature of the variant represented is that elevations respectively extending significantly in the direction of the associated light source 100 or 200 are formed inside the cavities, and these will subsequently be referred to as lens regions 560. As can be seen from the sectional representation, these lens regions 560 are formed approximately frustoconically in respect of their outer circumference, i.e. according to the sectional representation they comprise side walls 562 lying opposite the surface sections 550. The top surface 564 of the lens regions 560 is in turn likewise formed in the manner of a lens and has a slightly tapering depression or recess 566, the bottom surface of which is curved.

As can be seen particularly in the ray profiles represented in FIG. 6c, these lens regions 560 also exert an influence, in the form of refraction and total internal reflection, on the light emitted by the associated light source 100 or 200, although in contrast to the cooperative regions a lens region 560 influences exclusively the light of the respectively associated light source 100, 200. That is to say, as seen in sectional representation, the light directing element 500 alternately comprises lens regions 560 which influence exclusively the light of the associated light source 100, 200, and cooperative regions which influence the light of the two adjacent light sources 100, 200.

As can furthermore be seen from the sectional representation of FIG. 6c, the lower side of the light directing element 500 is provided with further angled surface regions and depressions in order to influence in the desired way the light emission which is finally achieved.

Figure 7A:
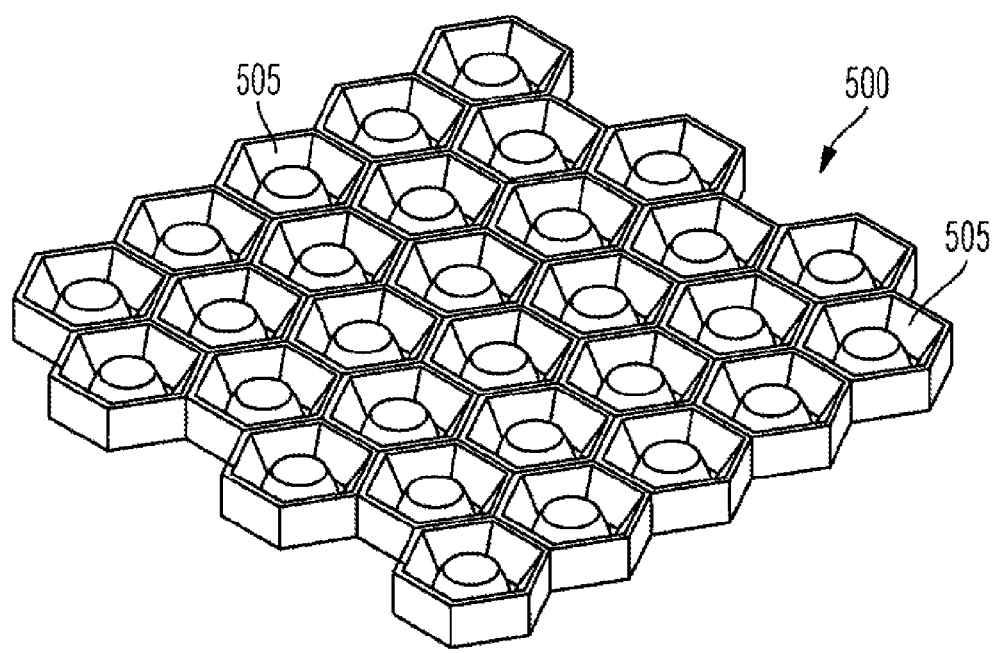
FIGS. 7a) to 7c) show a fifth exemplary embodiment of an arrangement for emitting light.
Figure 7B:
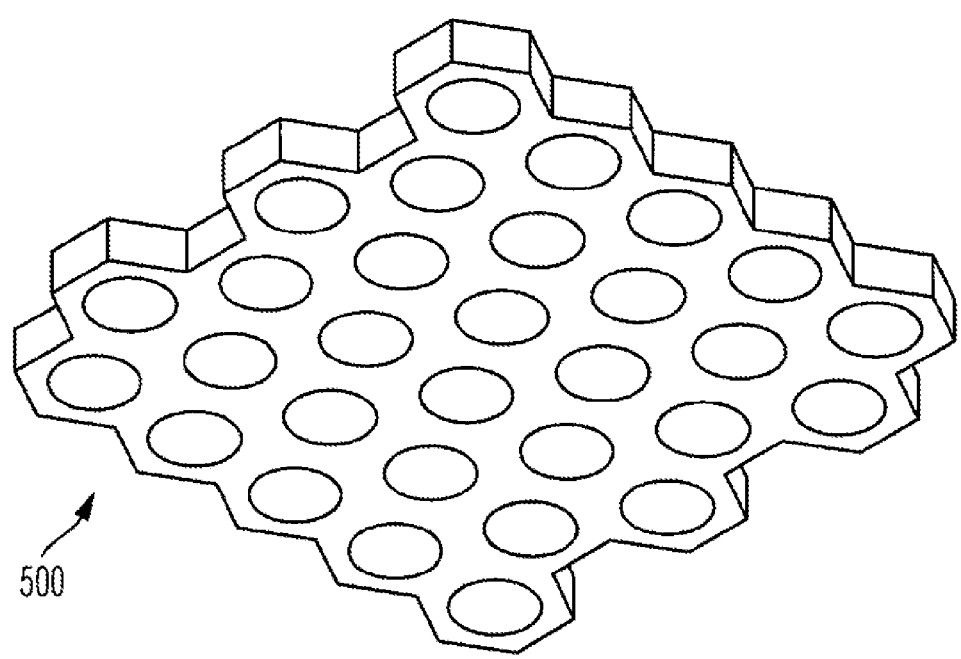
Figure 8D:
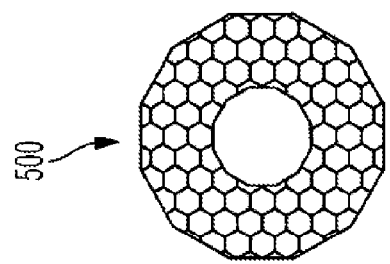
FIGS. 8a) to 8d) show exemplary embodiments of a method for producing a light directing element.
Figure 8C:
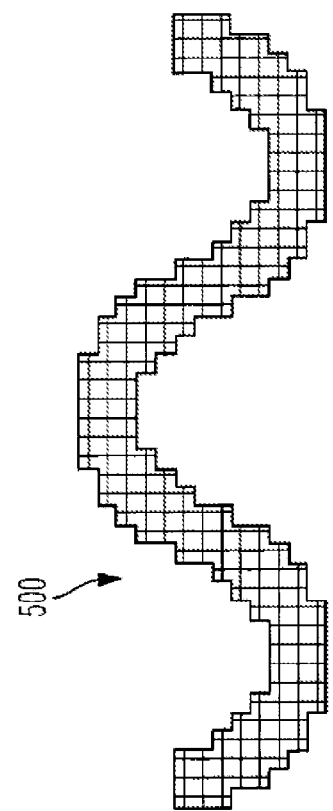
Figure 8B:
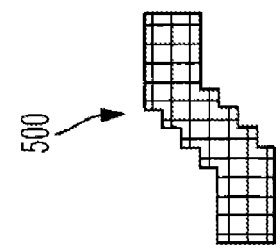
Figure 8A:
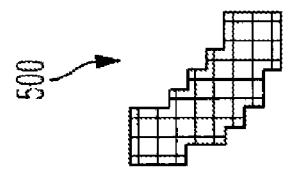

A further lens element 560, which influences exclusively the light of the light source 100, 200 arranged above it, is also respectively provided in the region of a cavity in the exemplary embodiment of FIGS. 7a to 7c. One difference from the exemplary embodiment of FIGS. 6a to 6c is that in this case the top surface 564 of the lens region 560 is configured differently, namely having an essentially point-like central depression 568 to which the surface extends in a curved fashion from the circumference inward. Furthermore, the lens regions 560 are now not provided with a recess on the lower side but instead have a dome, or spherical cap-shaped outward curvature. This ultimately leads to a different influence on the light of the light sources 100, 200, although the central concept of the invention is still implemented, namely that owing to the cooperative regions bridging the adjacent cavities 505 very effective light mixing is achieved, and at the same time the light output characteristic can also be influenced in a desired way. The examples illustrate in particular the fact that, by corresponding configuration of the cavities or of the lens regions contained therein, as well as of the lower side of the light directing element, influence can be exerted very efficiently on the light output characteristic of the overall arrangement, or on the light distribution curve achievable with the arrangement.

The solution according to the invention furthermore offers the possibility of advantageous manufacture or production of the light directing element 500, or of an arrangement for emitting light. FIGS. 8a to 8d respectively show a light emission element 500 which is manufactured by a method according to the invention for producing a light directing element 500.

To this end, a light directing element 500 according to the invention, preferably configured in a planar fashion, is to be manufactured. For example, a transparent light directing element could be produced, preferably from PMMA, preferably by an injection-molding method. In a further step, the light directing element 500 is then to be shaped in such a way that the desired shape is obtained.

For example, the light directing element 500 could be cut accordingly so that the wave-shaped, arc-shaped, or circular or donut-shaped light directing elements 500 represented in FIGS. 8a to 8d are obtained. Furthermore, for example, lines, rectangles, squares, steps or circles may also be envisioned as the basic shape of the light directing element 500. In particular, easy adaptability of the desired light emission can be achieved in this way. Particularly preferably, a laser cutting method or another restricted local shaping method may be envisioned for this, in particular a melting or ablation method, which can significantly reduce corresponding tool costs.

From the description above, it is clear that the invention significantly optimizes the possibilities of combining the light emission of a plurality of point light sources. The term bounding surface in the claims means a bounding surface or bounding surface section, formed on a light entry surface of the light directing member. Lastly, it should be pointed out that the combination of features of various exemplary embodiments or methods, or features disclosed in the figures, is included according to the invention.

The invention claimed is:

1. An arrangement for emitting light, comprising:
a plurality of spaced apart essentially point light sources, and
a light directing element having a bounding surface which is arranged in the beam path of the light of both a first light source and an adjacent second light source, wherein
the bounding surface forms a light entry surface for the light of the first light source into the light directing element, and the bounding surface simultaneously forms an internal reflection surface for the light of the second light source.

2. The arrangement for emitting light as claimed in claim 1, wherein the light directing element comprises cavities, in each of which one of the light sources is arranged, the bounding surface preferably forming a bounding surface of a cavity, in particular at least a part of the lateral surface of the cavity.

3. The arrangement for emitting light as claimed in claim 2, wherein each cavity comprises a lens region, which is preferably shaped frustoconically, extending from the bottom surface in the direction of the light source and separated from the lateral surface.

4. The arrangement for emitting light as claimed in claim 3, wherein the top surface of the lens region is shaped concavely or convexly.

5. The arrangement for emitting light as claimed in claim 3, wherein the top surface of the lens region has a depression.

6. The arrangement for emitting light as claimed in claim 2, wherein light exit surfaces of the light directing element which lie opposite the cavities are formed in the manner of lenses, and in particular are shaped concavely or convexly.

7. The arrangement for emitting light as claimed in claim 2, wherein the cavities have a polygonal base surface or a polygonal surface projection.

8. The arrangement for emitting light as claimed in claim 1, wherein reflection of the light of the second light source at the bounding surface takes place by total internal reflection.

9. The arrangement for emitting light as claimed in claim 1, wherein the light emission of the arrangement for emitting light is homogeneous, the light directing element preferably being formed in order to collimate the light of the light sources.

10. The arrangement for emitting light as claimed in claim 1, wherein the bounding surface is formed in a planar fashion.

11. The arrangement for emitting light as claimed in claim 1, wherein the bounding surface is curved, in particular parabolically.

12. The arrangement for emitting light as claimed in claim 1, wherein the light sources are arranged in a row or a two-dimensional grid.

13. The arrangement for emitting light as claimed in claim 1, wherein the light sources are arranged on a common support element, which is preferably planar.

14. The arrangement for emitting light as claimed in claim 1, wherein it comprises a plurality of light sources having mutually different light output, and in particular a different color spectrum or different color temperature, which are preferably arranged in a regular grid.

15. A light directing element for influencing the light of at least two essentially point light sources arranged next to one another, having a bounding surface which is arranged in the beam path of the light of both the first light source and the second light source, wherein the bounding surface forms a light entry surface for the light of the first light source into the light directing element and the bounding surface simultaneously forms a reflection surface for the light of the second light source on its side facing away from the light entry surface.

16. A method for producing a light directing element for an arrangement for emitting light as claimed in one of the preceding claims comprising the following steps:
- producing, in particular injection-molding, an essentially planar light directing element,
- shaping the light directing element, in particular by cutting, so that a desired shape of the light directing element is obtained.

* * * * *